US009872439B2

(12) United States Patent
Pohlmann et al.

(10) Patent No.: US 9,872,439 B2
(45) Date of Patent: Jan. 23, 2018

(54) COMBINE HAVING CLEANING VENTING BY A SUCTION BLOWER DRIVEN BY THE STRAW CHOPPER SHAFT

(71) Applicant: Deere & Company, Moline, IL (US)

(72) Inventors: Norbert Pohlmann, Kempen (DE); Dirk Weichholdt, Woelfling les Sarreguemin (FR); Eric Loutz, Erching Guiderkirch (FR); Rico Guido Priesnitz, Lebach (DE); Benjamin Peschel, Contwig (DE); Christina Fries, Nohfelden (DE); Gregor Diessner, Schweigen-Rechtenbach (DE); Peter Mischler, Kaiserslautern (DE); Oliver Klein, Saarlouis (DE); Friedrich Lauer, Kraehenberg (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/283,597

(22) Filed: Oct. 3, 2016

(65) Prior Publication Data
US 2017/0112066 A1 Apr. 27, 2017

(30) Foreign Application Priority Data
Oct. 21, 2015 (DE) .................. 10 2015 220 561

(51) Int. Cl.
A01F 12/48 (2006.01)
A01F 12/40 (2006.01)
A01D 41/00 (2006.01)
A01F 12/44 (2006.01)
A01D 41/12 (2006.01)

(52) U.S. Cl.
CPC .......... *A01F 12/48* (2013.01); *A01D 41/1243* (2013.01); *A01F 12/444* (2013.01)

(58) Field of Classification Search
CPC ...... A01F 12/444; A01F 12/48; A01D 41/243
USPC .................................. 460/111, 112
See application file for complete search history.

(56) References Cited

U.S. PATENT DOCUMENTS

| 4,711,253 A * | 12/1987 | Anderson | A01D 41/1243 460/100 |
| 6,685,558 B2 * | 2/2004 | Niermann | A01D 41/1243 460/111 |
| 7,731,578 B2 * | 6/2010 | Birrell | A01F 12/444 460/100 |
| 8,010,262 B2 * | 8/2011 | Schroeder | A01D 41/1243 701/50 |

(Continued)

FOREIGN PATENT DOCUMENTS

| DE | 19624733 A1 | 1/1998 |
| DE | 10064356 A1 | 7/2002 |

(Continued)

OTHER PUBLICATIONS

European Search Report in foreign counterpart application No. 16188291.5 dated Mar. 20, 2017 (5 pages).

*Primary Examiner* — John G Weiss

(57) ABSTRACT

A combine (10) includes a cleaning system (28) and an air conduit (80), which air conduit is arranged outside of a side wall (78) and through which the cleaning air is conducted downstream of the cleaning screens (48, 50, 66) to a suction blower (86) of the straw chopper (68), which suction blower is driven by a drive shaft (96).

3 Claims, 3 Drawing Sheets

(56) References Cited

U.S. PATENT DOCUMENTS

| | | | |
|---|---|---|---|
| 8,105,140 B2 * | 1/2012 | Teroerde | A01D 41/1243 460/112 |
| 2007/0066370 A1 | 3/2007 | Redekop et al. | |
| 2015/0230408 A1 | 8/2015 | Pohlmann et al. | |
| 2016/0044870 A1 * | 2/2016 | Mayerle | A01F 12/40 460/112 |
| 2017/0231154 A1 * | 8/2017 | Holmen | A01D 41/1243 460/112 |

FOREIGN PATENT DOCUMENTS

| | | |
|---|---|---|
| DE | 102004049965 A1 | 4/2006 |
| DE | 102005027726 A1 | 1/2007 |
| DE | 102006017789 A1 | 10/2007 |
| EP | 0291336 B1 | 10/1991 |
| EP | 0631717 A1 | 1/1995 |
| EP | 1177719 A1 | 6/2002 |
| EP | 0959659 B1 | 10/2002 |
| EP | 1754408 A2 | 2/2007 |
| EP | 1869969 A2 | 12/2007 |

\* cited by examiner

COMBINE HAVING CLEANING VENTING BY A SUCTION BLOWER DRIVEN BY THE STRAW CHOPPER SHAFT

FIELD OF THE INVENTION

The invention relates to a combine comprising: a supporting structure, on the front side of which an inclined conveyor is mounted; a threshing and separating device mounted inside the supporting structure and comprising a crop residue outlet through which the crop residues can be fed to a straw chopper; a cleaning system to which grain separated by the threshing and separating device can be supplied and which is equipped with a cleaning blower for generating an air flow, and at least one cleaning screen to which the air flow can be applied and which can be set into an oscillating motion to separate grain and chaff; and an air-conducting line that extends between an inlet, arranged downstream of the cleaning screen in relation to the air flow, and a suction blower.

BACKGROUND OF THE INVENTION

Agricultural combines are large machines that harvest, thresh, separate and clean agriculturally raised crops bearing grain. The clean grain obtained is stored in a grain tank arranged on the combine. The threshed straw is generally either chopped and spread out on the field across the width of the chopping mechanism, or diverted around the straw chopper and deposited unchopped in a swath in order to be subsequently taken up in a baler. The remaining crop residue at the rear outlet of the cleaning system, such as chaff and small pieces of straw, is distributed on the field by a chaff scattering device, or directed through the straw chopper and spread on the field.

The cleaning unit comprises a cleaning blower that draws in outside air and conducts the air from below against cleaning screens that are set into an oscillating motion so that heavy crop particles, more particularly grains, fall down through the cleaning screens, and impurities such as straw particles and chaff are blown away to the rear.

Therefore, a positive pressure is created inside the cleaning unit, i.e. there is an air pressure that is greater than the ambient pressure. In the prior art, the cleaning air stream is output into the surroundings to a relatively small degree through lateral housing openings of the combine, while the main part of the cleaning air stream is conveyed away by the straw chopper (cf. DE 196 24 733 A1 and DE 100 64 356 A1 for example), for which special air conveying means such as air baffles are provided on the straw chopper rotor (DE 10 2006 017 789 A1) or on the chopper blades (DE 10 2004 049 965 A1).

It has also been proposed to mount additional suction blowers in the rear area of the combine in order to draw off the cleaning air stream and feed it to the straw chopper, or to assign the function of the suction blower to the straw chopper, i.e. to feed the cleaning air stream to the straw chopper through separate lines, without using a separate suction blower (cf. EP 1 177 719 A1, which is considered to define the generic type in question).

Finally it has been proposed to connect fans, which are arranged outside of the combine housing and are intended to help discharge the chopped material, to the straw chopper shaft (EP 0 959 659 B1, EP 1 754 408 A2, US 2007/0066370 A1). These fans have no influence on the air pressure in the cleaning unit.

If the air pressure inside the cleaning unit becomes too high, the intended cleaning effect is no longer guaranteed since the flow conditions of the cleaning air stream that were intended by the designer are no longer present. If only the straw chopper is to convey away the cleaning air stream, a large part of its driving power is consumed only for conveying air. The embodiment of EP 1 177 719 A1, in which a separate suction blower is used has the disadvantage that associated drive trains must be provided to drive the blower. In addition, both embodiments require lines, which are difficult to access and therefore difficult to maintain, in the interior of the combine between the cleaning unit and the suction blower or straw chopper. These lines can also disadvantageously influence the air flow inside the combine.

The problem addressed by the invention is considered to be the provision of a combine in which the aforementioned disadvantages are not present or are present only to a reduced extent.

SUMMARY OF THE INVENTION

A combine is provided with: a supporting structure, on the front side of which an inclined conveyor is mounted; a threshing and separating device mounted inside the supporting structure and comprising a crop residue outlet through which the crop residues can be fed to a straw chopper; a cleaning system to which grain separated by the threshing and separating device can be supplied and which is equipped with a cleaning blower for generating an air flow, and at least one cleaning screen to which the air flow can be applied and which can be set into an oscillating motion to separate grain and chaff; and an air-conducting line that extends between an inlet, arranged downstream of the cleaning screen in relation to the air flow, and a suction blower. The air-conducting line is situated (at least in part) on the outer side of a side wall of the cleaning system, and the suction blower is arranged coaxially to a drive shaft of the straw chopper and is drivingly connected to the drive shaft of the straw chopper.

In this manner, the air pressure downstream of the cleaning system and thus also inside the cleaning system is reduced by simple means, by drawing off the cleaning air downstream of the cleaning screen and feeding it via a line arranged outside the side wall of the cleaning system to a suction blower that is directly driven by the drive shaft of the straw chopper. The straw chopper is relieved of the task of drawing off the cleaning air, which reduces its energy requirements. The desired function of the cleaning system is accordingly no longer (or less) deteriorated by undesired positive pressure.

BRIEF DESCRIPTION OF THE DRAWINGS

Two embodiments of the invention will be described with reference to the Figures, in which.

DETAILED DESCRIPTION OF THE PREFERRED EMBODIMENTS

Figure 1:
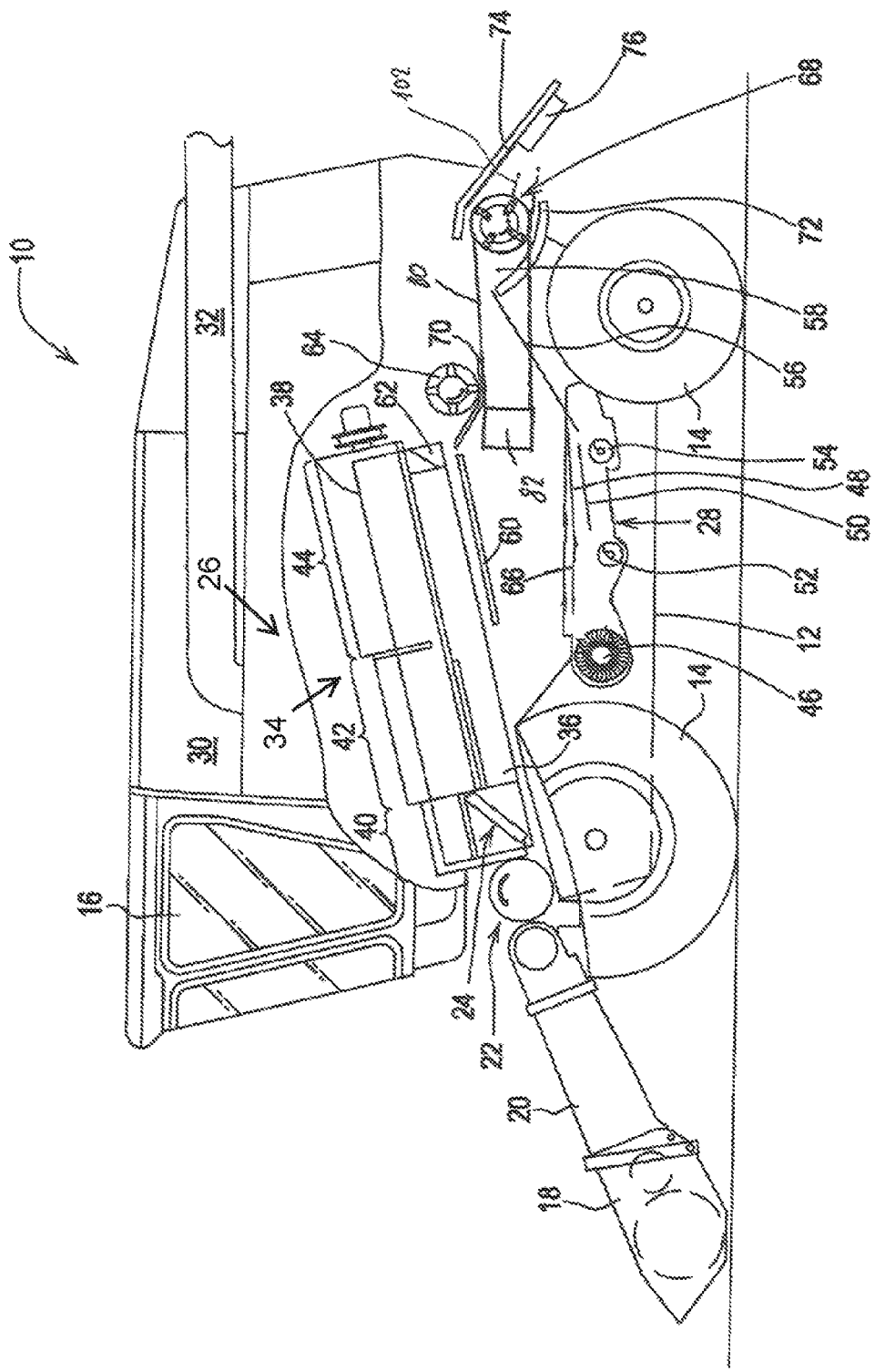
FIG. 1 shows a partially cutaway side view of a combine having a cleaning system and an air-conducting line that connects an inlet downstream of the cleaning system to a suction blower arranged on the drive shaft of the straw chopper.

FIG. 1 shows an agricultural combine 10 with a chassis 12 having wheels 14 engaged with the ground that are mounted on the chassis 12 and serve to propel the combine 10 in the forward direction, which runs to the left in FIG. 1. The operation of the combine 10 is controlled from the operator cab 16. A cutting mechanism 18 is used to harvest a crop containing grain and supply it to an inclined conveyor 20. The harvested crop is supplied by the inclined conveyor 20 to a guide drum 22. The guide drum 22 directs the crop through an inlet transitional section 24 to an axial crop processing system 26. Directional indications such as front and back refer below to the forward direction of the combine 10, which runs to the left in FIG. 1.

The crop processing system 26 performs the function of threshing the cut crop material and separating threshed grain from the material other than grain (MOG). It comprises a threshing and separating device, which further comprises a rotor housing 34 and a rotor 36 arranged therein.

The crop processing system 26 defines three functional sections: a loading section 40 at the forward end of the crop processing system 26, a threshing section 42 behind and downstream of the loading section 40, and a separation section 44 behind and downstream of the threshing section 42.

The rotor 36 comprises a hollow drum 38 to which are fixed crop processing elements. Crop processing elements mounted in the loading section 40 are configured to load crop material into the crop processing system 26. Crop processing elements mounted in the threshing section 42 are configured to thresh the cut crop material in the crop processing system 26. Crop processing elements mounted in the separation section 44 are configured to separate the threshed grain from the material other than grain.

The drum 38 in the loading section 40 has the shape of a truncated cone. The drum 38 in the threshing section 42 has a front section with a truncated conical shape and the rear section with a cylindrical shape. The drum 38 in the separation section 44 has a cylindrical shape and is situated at the end of the axial crop processing system 26.

In an alternative arrangement, the illustrated crop processing system 26 may comprise a tangential threshing drum and an axial separation device following it, or a straw shaker following the tangential threshing drum, can also be used.

Grain and husks that fall through a threshing basket associated with the threshing section 42 and a separating grating associated with the separation section 44 are fed by a front conveyor (not shown) and a rearward conveying floor 60 arranged underneath the separation section 44 to a preliminary screen 66 of a cleaning system 28. The cleaning system 28 comprises a cleaning blower 46 and cleaning screens 48, 50, constructed as straw walkers, which can be set into an oscillating motion. The cleaning system 28 removes the chaff and feeds the clean grain via a screw conveyor 52 to an elevator for clean grain (not shown). The elevator for clean grain deposits the clean grain in a grain tank 30. The clean grain in the grain tank 30 can be discharged by a discharge screw conveyor 32 onto a grain wagon, trailer or truck. Crop remaining at the rear end of the lower cleaning screen 50 is fed by means of a screw conveyor 54 and a return conveyor (not shown) back to the crop processing system 26 or to a separate secondary thresher. The crop residues deposited at the rear end of the upper straw walker 48, which consist essentially of chaff (husks) and small straw particles, are conveyed by a vibrating conveyor 56 to the rear into an inlet 58 of a straw chopper 68.

Threshed straw exiting from the separation section 44 is ejected from the crop processing system 26 through an outlet 62 and fed to an ejection drum 64. The ejection drum 64, cooperating with a floor 70 arranged underneath it, ejects the straw to the rear, so that it likewise enters into the inlet 58 of the straw chopper 68. The straw chopper 68, cooperating with a chopper floor 72 on which counter-blades can be mounted, ejects the chopped material to the rear, where it is deflected by guide shoes 76 arranged underneath a distributor floor 74 for a passive straw distributor (or ejection blowers, not shown) and is distributed laterally across the field. In contrast to what is shown, an additional conveyor drum can be provided between the ejection drum 64 and the straw chopper 68, which creates the possibility of laying down a swath, in which the straw above the distributor floor 74 is deposited on the field as a swath (cf. DE 10 2008 001 460 A1).

In operation, the cleaning blower 46 draws in outside air and discharges it to the rear, in order to apply cleaning air to the cleaning screens 48, 50 and 66 from below and the front. In addition, cleaning air can be applied to a winnowing step between the cleaning screen 66 and the cleaning screen 48. The cleaning blower 46 comprises, in a conventionally known manner (cf. DE 10 2005 027 726 A1 and the prior art mentioned there), a plurality of radial fans arranged laterally one next to another, which are arranged inside associated housings and can be driven by a common shaft. The housings are provided with axial air inlet openings. The housings form air stream inlet channels, which are delimited by side walls of the housing between the radial fans. In operation, the radial fans accordingly draw in air from the exterior through the air inlet openings in the axial direction and discharge it into the air stream channels in order to apply it to the cleaning screens 48, 50 and 66.

The cleaning system 28 is located within a shell substantially sealed toward the exterior and formed by the supporting structure 12. This means that the air drawn in by the cleaning blower 46 can escape from the combine 10 only to the rear through the straw chopper 68; in certain operating situations, particularly at relatively large material throughputs, a relatively high positive pressure is built up inside the cleaning system 28, which impairs the proper functioning thereof. To discharge the cleaning air stream into the surroundings, lateral openings in the side walls 78 that are conventionally known (see FIG. 2) could be provided, particularly above the straw walker 56, but the effectiveness thereof is limited. In the prior art, it is therefore necessary to provide a sufficient air-conveying power for the straw chopper 68 in order to maintain the positive pressure inside the supporting structure 12 of the combine 10 within tolerable limits relative to the air flow of the cleaning blower 46 downstream of the cleaning system 28, and therefore also in the cleaning system 28, without having to provide separate suction blowers in order to reduce this positive pressure.

Figure 2:
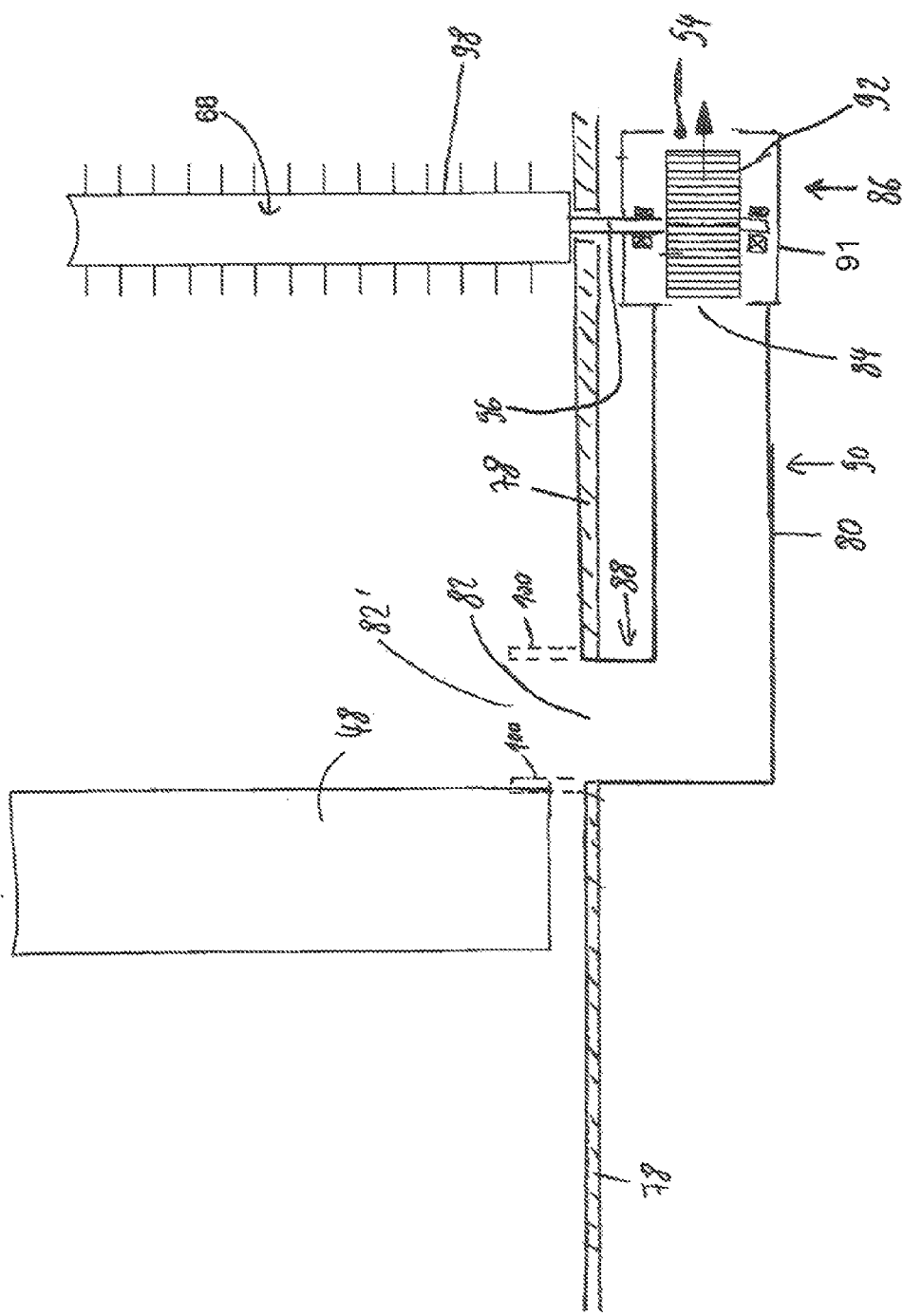
FIG. 2 shows a plan view of the cleaning system from FIG. 1.

To address this problem, an air conduit 80 is provided on each side of the combine 10 and extends between an inlet 82 arranged downstream of the cleaning screen relative to the air flow and an air inlet 84 of a separate suction blower 86, in order to receive air from the cleaning blower 46 downstream of the cleaning system 28, and thus downstream of the cleaning screens 48, 50, and to feed it to the suction blower 86 (cf. FIG. 2). The inlet 82 is located above the upper cleaning screen 48 and behind the rearward end thereof. The inlet 82 is constructed as an opening in the side wall 78 of the supporting structure 12. The inlet 82 can have a rectangular or square cross section as shown, or any other cross section, e.g. circular.

The air conduit 80 may be a hollow pipe or a tubular welded assembly.

The air conduit 80 may include a first portion 88, which adjoins the inlet 82 and is oriented transversely to the forward direction of the combine 10.

The first portion 88 may be adjoined to a second portion 90 that extends to the rear, and which transitions at the air inlet 84 of the suction blower 86 into the housing 91. The suction blower 86 comprises any desired fan 92, illustrated here as a radial fan, and draws air out of the inlet 82 and reduces any existing positive pressure in the cleaning system 28. The air is ultimately discharged by the suction blower 86 by means of an outlet 94 to the rear, upward, downward and/or to the side.

The fan 92 is driven by a drive shaft 96 connected to the rotor 98 of the straw chopper 68. The drive train (not shown in FIG. 2, but cf. EP 0 291 336 B1) of the straw chopper 68 accordingly also drives the fan 92, which saves a separate drive train for driving the latter. The bearing assembly for the drive shaft 96 can be inside the housing 91, as shown in FIG. 2, and/or can be formed by bearings of the drive shaft 96 inside the side walls 78.

It would be possible to shift the inlet 82' of air conduit 80 inward (in the direction toward the center of the combine 10) as is shown by the optional suction connector 100 drawn in dashed lines in FIG. 2, which is located on the inner side of the side wall 78.

Figure 3:
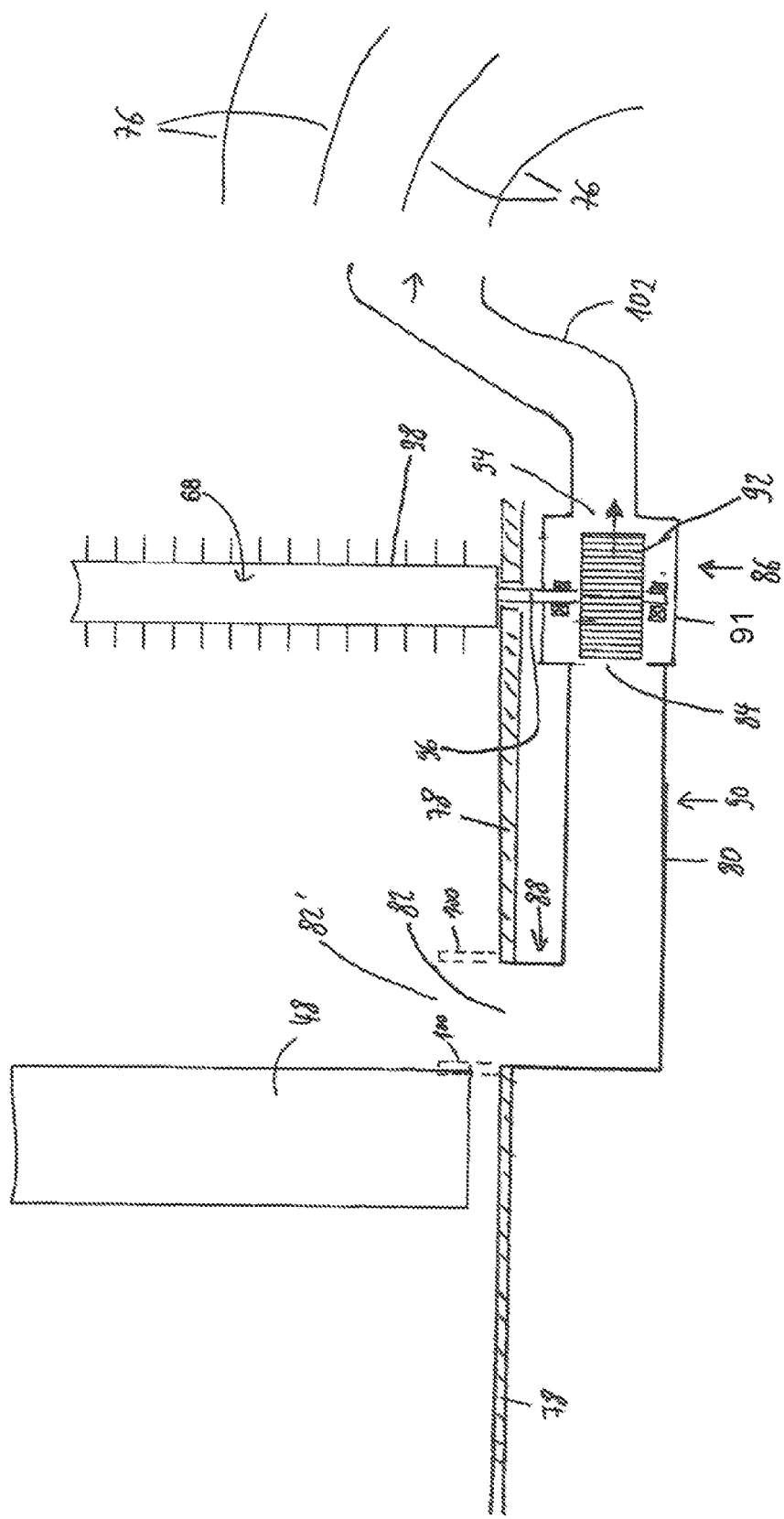
FIG. 3 shows a plan view of a second embodiment of the cleaning system from FIG. 1.

In the second embodiment, shown in FIG. 3, the outlet 94 is directed toward the outer guide shoe 76 in order to provide an increased air flow there and promote the ejection of the chopped material to the side. For this purpose, the outlet 94 is adjoined by an additional air conduit 102 or a nozzle, which is drawn in dashed lines in FIG. 1 and directs the air flow produced by the suction blower 86 in a targeted manner onto the front end of the outer guide shoe 76. The air flow produced by the suction blower 86 accordingly is used to increase the throw distance of the passive straw distributor. If the passive straw distributor equipped with the guide shoes 76 is replaced by driven ejection blowers, the air flow from the additional air conduit 102, one of which is arranged on each side of the combine 10, would be directed on the input side into a respective ejection fan and also improve the effect thereof or reduce the drive power therefor for a given throw distance.

The present invention is defined by the claims of the patent. The illustrations and description herein are provided to illustrate at least one way to make and use the invention. Other ways to make and use the invention are also possible.

The invention claimed is:

1. A combine (10) comprises:
a supporting structure (12), on the front side of which an inclined conveyor (20) is mounted;
a threshing and separating device mounted inside the supporting structure (12) and comprising a crop residue outlet through which crop residues can be fed to a straw chopper (68);
a cleaning system (28) to which grain separated by the threshing and separating device can be supplied and which is equipped with a cleaning blower (46) for generating an air flow, and at least one cleaning screen (48, 50, 66), to which the air flow can be applied and which can be set into an oscillating motion to separate grain and chaff; and
an air conduit (80) that extends between an inlet (82), arranged downstream of the at least one cleaning screen (48, 50, 66) in relation to the air flow, and a suction blower (86), characterized in that the air conduit (80) is situated on the outer side of a side wall (78) of the cleaning system (28) and in that the suction blower (86) is arranged coaxially with a drive shaft (96) of the straw chopper (68) and is drivingly connected thereto.

2. The combine (10) according to claim 1, wherein an outlet (94) of the suction blower (86) is adjoined by an additional air conduit (102), which is designed to direct and air stream generated by the suction blower (86) onto front ends of external guide shoes (76) of a passive straw distributor arranged downstream of the straw chopper (68), or into the inlet of a driven ejection fan arranged downstream of the straw chopper (68).

3. Combine (10) according to claim 1 or 2, wherein a suction connector (100) that is connected to the air conduit (80) is arranged on the inner side of the side wall (78).

* * * * *